(12) United States Patent
Iotti

(10) Patent No.: US 10,035,462 B2
(45) Date of Patent: Jul. 31, 2018

(54) SELF-PROPELLED WORKING MACHINE

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

(*) Notice: Subject to any disclaimer, the term of this patent is extended or adjusted under 35 U.S.C. 154(b) by 0 days.

(21) Appl. No.: 15/373,080

(22) Filed: Dec. 8, 2016

(65) Prior Publication Data
US 2017/0182946 A1 Jun. 29, 2017

(30) Foreign Application Priority Data
Dec. 28, 2015 (IT) .................. 102015000088074

(51) Int. Cl.
*B60R 3/00* (2006.01)
*B60R 3/02* (2006.01)
(Continued)

(52) U.S. Cl.
CPC .............. *B60R 3/02* (2013.01); *B60J 5/0486* (2013.01); *B60J 5/0487* (2013.01); *B60J 5/0493* (2013.01);
(Continued)

(58) Field of Classification Search
CPC .. B60R 3/02; B60R 3/00; B60R 3/002; B60R 3/007; B60J 5/04; B60J 5/00;
(Continued)

(56) References Cited

U.S. PATENT DOCUMENTS 1,467,976 A * 9/1923 Gannon .................... B60R 3/02
280/166
2,263,782 A * 11/1941 Landsberg ................ B60R 3/02
280/166
(Continued)

FOREIGN PATENT DOCUMENTS

DE 38 26 542 A1 2/1990
DE 101 51 931 A1 5/2003
(Continued)

*Primary Examiner* — James M Dolak
(74) *Attorney, Agent, or Firm* — Pearne & Gordon LLP

(57) ABSTRACT

The self-propelled working machine (1) comprises: moving means (2) configured for allowing movement of the machine on a bearing plane (3); propulsion means (4) operatively associated to the moving means and configured to cause and maintain the movement of the working machine on the bearing plane; a frame (5) supporting the moving means and the propulsion means, an operating member (6) and relative actuating means, a maneuver cab (7) arranged directly or indirectly on the frame (5) and comprising at least an access door (8), the cab (7) and the frame (5) defining an encumbering volume of the machine.

The machine 1 comprises a step board (11) arranged at the access door (8) of the maneuver cab (7) and coupling means (13, 17) operatively associated to the maneuver cab (7) and/or to the frame (5) of the working machine for supporting said step board (11), the coupling means being configured for allowing an actuation movement of the step board (11) between a retracted position in which said step board (11) remains substantially inside the encumbering volume, and an extracted position in which it protrudes, thereby defining a supporting surface, walkable by the operator, able to facilitate entering the maneuver cab.

12 Claims, 5 Drawing Sheets

(51) Int. Cl.
  *B60J 5/04* (2006.01)
  *B62D 33/06* (2006.01)
  *B61D 23/02* (2006.01)

(52) U.S. Cl.
  CPC ........... *B61D 23/025* (2013.01); *B62D 33/06* (2013.01); *B60Y 2200/40* (2013.01)

(58) Field of Classification Search
  CPC ...... B60J 5/0493; B60J 5/0487; B60J 5/0486; B62D 33/06; B61D 23/02; B61D 23/00; B61D 23/025
  See application file for complete search history.

(56) References Cited

U.S. PATENT DOCUMENTS

| | | | | |
|---|---|---|---|---|
| 2,665,921 A * | 1/1954 | Schetzer | .................. | B60R 3/04 15/237 |
| 3,671,058 A | 6/1972 | Kent | | |
| 3,784,227 A * | 1/1974 | Rogge | .................. | B60R 3/02 280/166 |
| 3,888,510 A * | 6/1975 | Maske | .................. | B60R 3/02 280/166 |
| 4,131,209 A * | 12/1978 | Manning | .................. | A61G 3/061 105/433 |
| 4,570,962 A * | 2/1986 | Chavira | .................. | B60R 3/02 105/447 |
| 6,179,312 B1 * | 1/2001 | Paschke | .................. | B60R 3/02 105/444 |
| 9,637,057 B2 * | 5/2017 | Lee | .................. | B60R 3/02 |
| 9,776,571 B2 * | 10/2017 | Fortin | .................. | B60R 3/02 |
| 9,834,147 B2 * | 12/2017 | Smith | .................. | B60R 3/02 |
| 9,909,355 B1 * | 3/2018 | Jochum | .................. | E06B 5/10 |
| 2009/0273154 A1 | 11/2009 | Kuula | | |

FOREIGN PATENT DOCUMENTS

| | | |
|---|---|---|
| EP | 1 820 696 A1 | 8/2007 |
| WO | 2006/078195 A1 | 7/2006 |

* cited by examiner

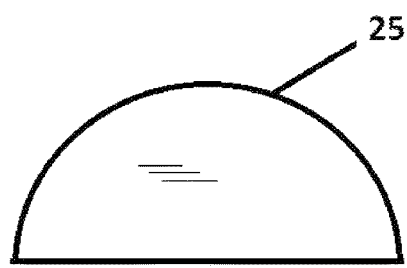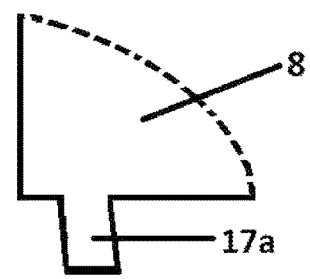
FIG. 6  FIG. 7
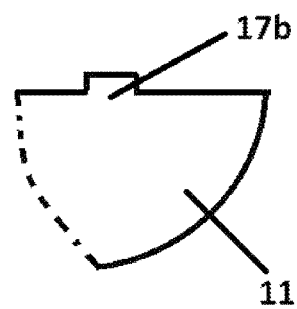
FIG. 8

SELF-PROPELLED WORKING MACHINE

The present invention relates to a self-propelled working machine.

The term self-propelled working machine is understood to mean a mobile vehicle, for example on wheels or tracks, able to carry out specific works, for example agricultural, construction or road ones.

Examples of self-propelled working machines are lift trucks or handling machines equipped with a telescopic arm, either fixed or on a rotating turret, but also diggers and other machines besides.

In general self-propelled working machines comprise a frame supporting moving means (wheels, tracks or the like), propulsion means and, directly or indirectly, the operating member or members (for example a lift arm or lift forks, a bucket, a gripping member or another besides) and the relative actuating means. A maneuver cab is arranged on the frame, suitable for housing the operator and comprising a control panel of the movement of the machine and the actuating of the operating member (or members). The cab is generally closed by at least a door for enabling isolation of the operator during use of the machine and for preventing access to unauthorised third parties during phases of non-use of the machine.

Generally the frame of the working machines is raised so as to enable movement and use thereof on bumpy terrains, for example building or road worksites.

The position of the maneuver cab must first of all meet the safety requirements and efficiency requirements, mainly in regard to visibility for the operator both when the machine is in use and during movement thereof. Some aspects that can have a negative effect on the visibility are the position and type of the operating members. For example, in the case of telescopic lifting machines, an obstacle to visibility is constituted by the telescopic arm which, when resting, is in the retracted and lowered configuration thereof and protrudes frontally of the cab, as well as flanking it.

A further need that is well-established is that of obtaining a homologation for road use, so that the machine can autonomously reach the worksite without being classed as "exceptional transport", which latter have to be carefully planned and require an escort, thus impacting on times, costs and comfort of movement of the machine.

For example, in the case of telescopic lift trucks, for the purposes of homologation the distance between the distal end of the arm and a point internal of the cab is evaluated, which latter point can be for example constituted by the operator's point of view or the position of the centre of the steering wheel.

For the purposes of homologation for road use, this distance must be contained within predetermined limits set by the relevant regulations.

With the purpose of entering into the established parameters for this homologation, with an equal length of arm, the machine can be modified by retracting the arm with respect to the cab and, if the retracting is not sufficient or would require an excessive counter-balancing, moving the cab forward.

In this last case, the access door to the maneuver cab is de-aligned with respect to the access steps, requiring a certain expertise on the operator's part both to reach the maneuver cab and open the door at the same time. In fact, in a case where the cab is advanced with respect to the steps, the operator is forced to rise onto the machine by climbing the steps obliquely, to the detriment of the ease, comfort and ergonomic practicability of the operation.

In this context, the technical task underlying the present invention is to propose a self-propelled working machine which obviates the drawbacks in the prior art as described above and enables meeting the above-described needs.

In particular, an aim of the present invention is to make available a self-propelled working machine which facilitates access of the operator to the maneuver cab, independently of the position chosen, in particular with regard to road-use homologation.

A further object of the present invention is to make available a self-propelled working machine also able to guarantee an optimal visibility.

The stated technical task and specified aims are attained by a self-propelled working machine realised according to claim 1.

Further characteristics and advantages of a preferred, but not exclusive, embodiment, of a self-propelled working machine according to the invention, are set out in the following detailed description, with reference to the appended drawings, provided by way of non-limiting example, in which:

FIG. 6 illustrates lunette-shaped;

FIG. 7 illustrates in side elevational view the first portion (17*a*) provided in a single piece with the access door (8); and FIG. 8 illustrates in bottom plan view the second portion (17*b*) provided in a single piece with the step board (11).

With reference to the appended figures, 1 illustrates the self-propelled working machine of the invention.

In particular, the appended figures illustrate a fixed-type telescopic arm lift truck.

Alternatively, the present invention can relate to any other type of self-propelled working machine 1 according to the definition supplied, for example a telescopic arm lift truck mounted on a rotating turret, etc.

The machine 1 comprises moving means, for example wheels 2, configured for allowing movement of the machine on a bearing plane 3. Alternatively track means, or the like, can be provided as moving means.

The machine 1 comprises propulsion means operatively associated to the moving means and configured to cause and maintain the movement of the working machine on the bearing plane 3. Such propulsion means can comprise an engine 4, preferably an internal combustion engine.

5 denotes a frame of a machine 1 supporting the moving means and the propulsion means. By the term frame is meant a supporting and containing structure comprising both a supporting chassis and possibly protection casings or bodywork elements.

Figure 1:
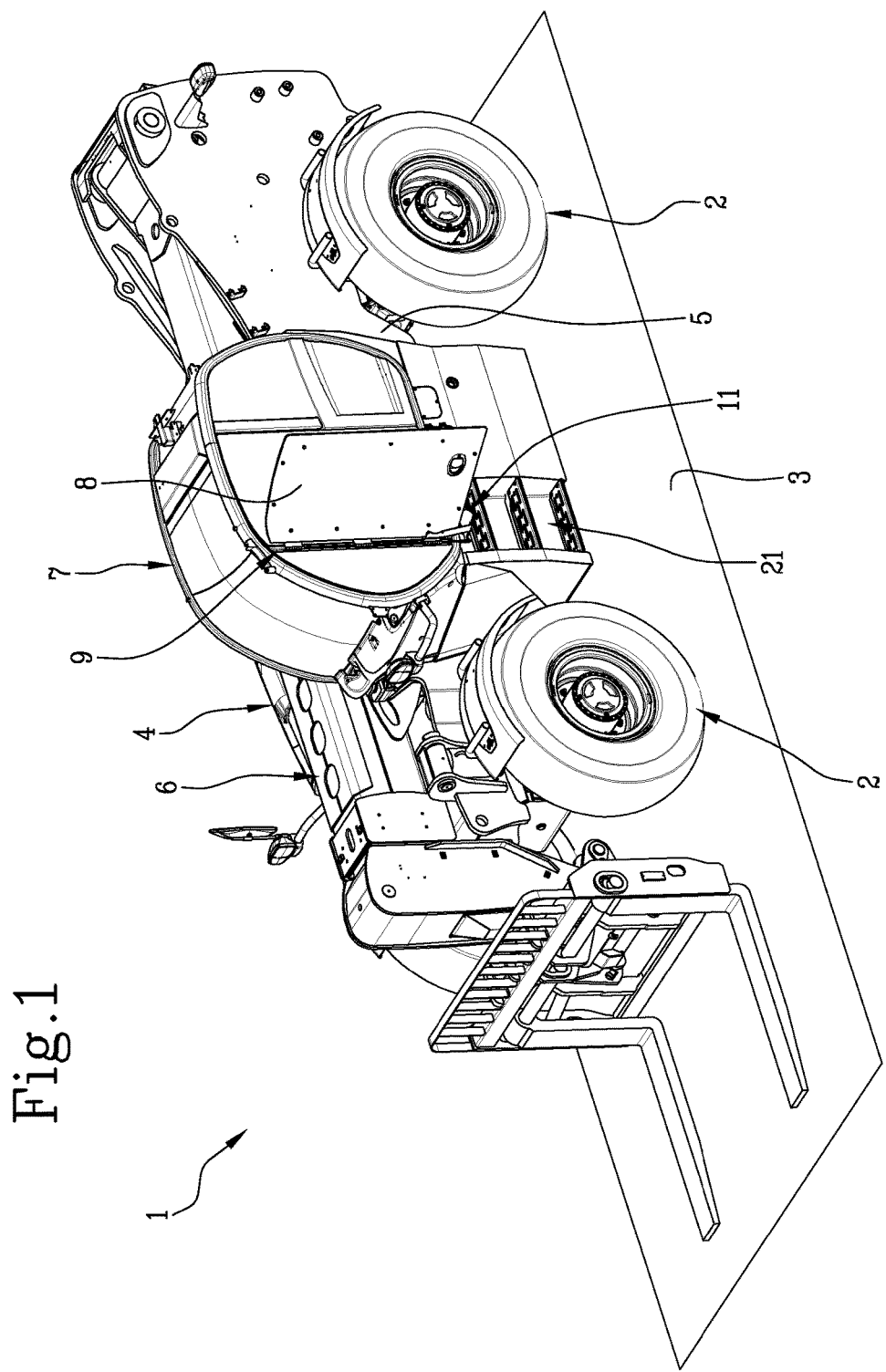
FIG. 1 and FIG. 1A illustrate respective perspective views of self-propelled working machines in which the present invention is realised.
Figure 1A:
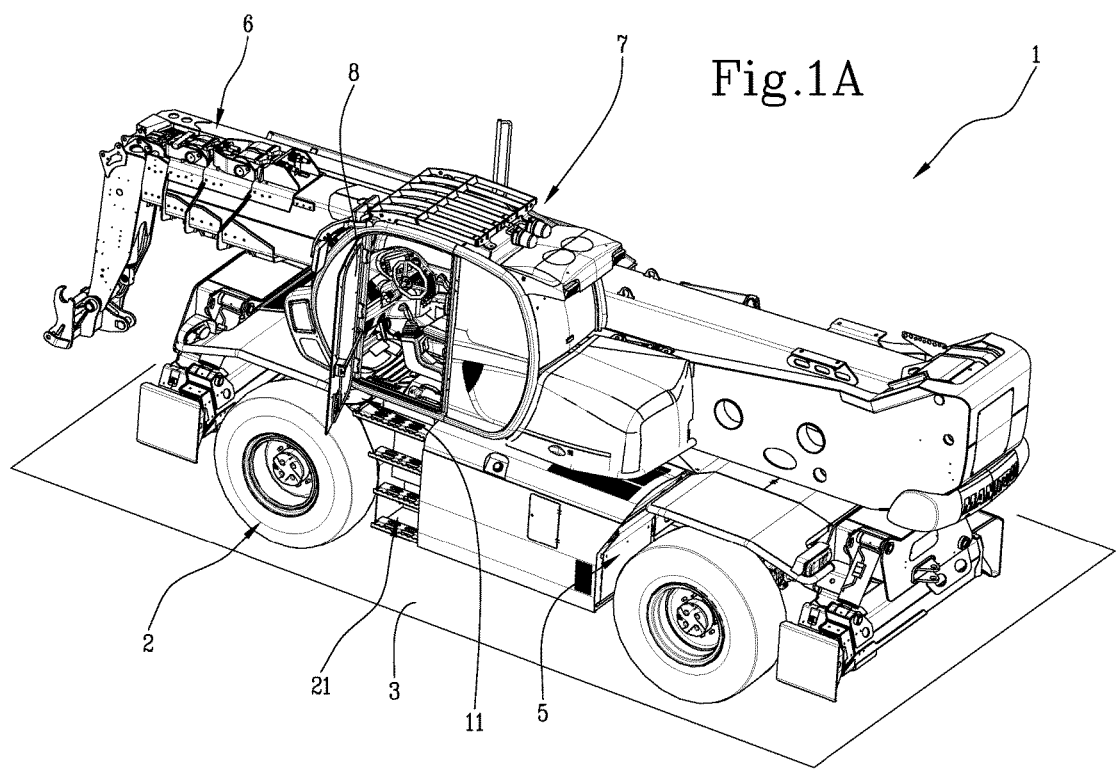
Figure 2:
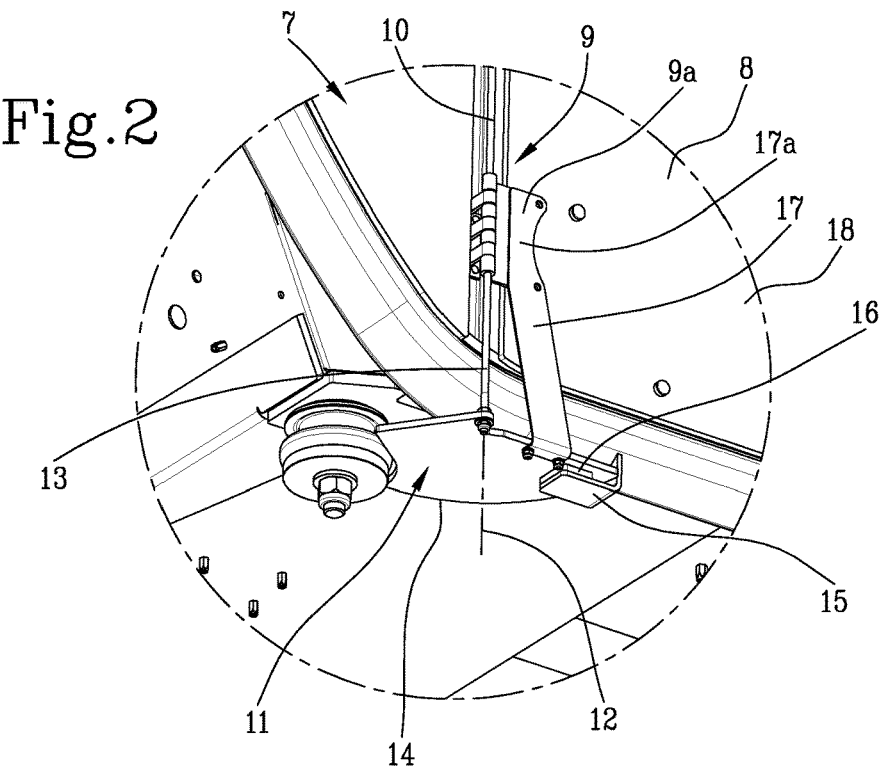
FIGS. 2 and 3 illustrate a perspective view of a detail in larger scale of FIG. 1 in two different operating conditions.
Figure 3:
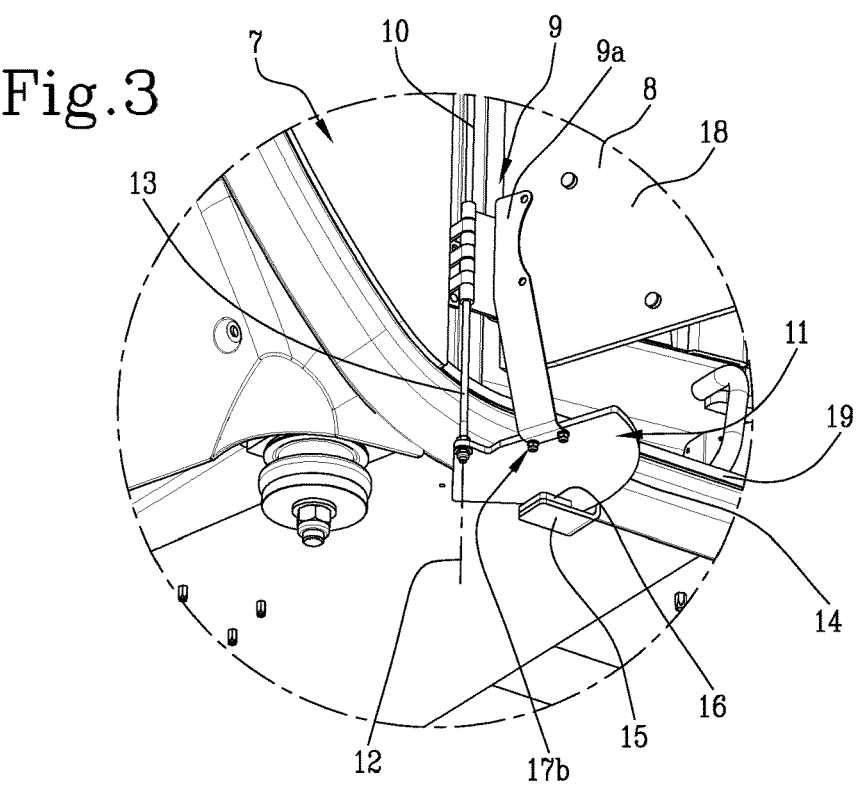
Figure 4:
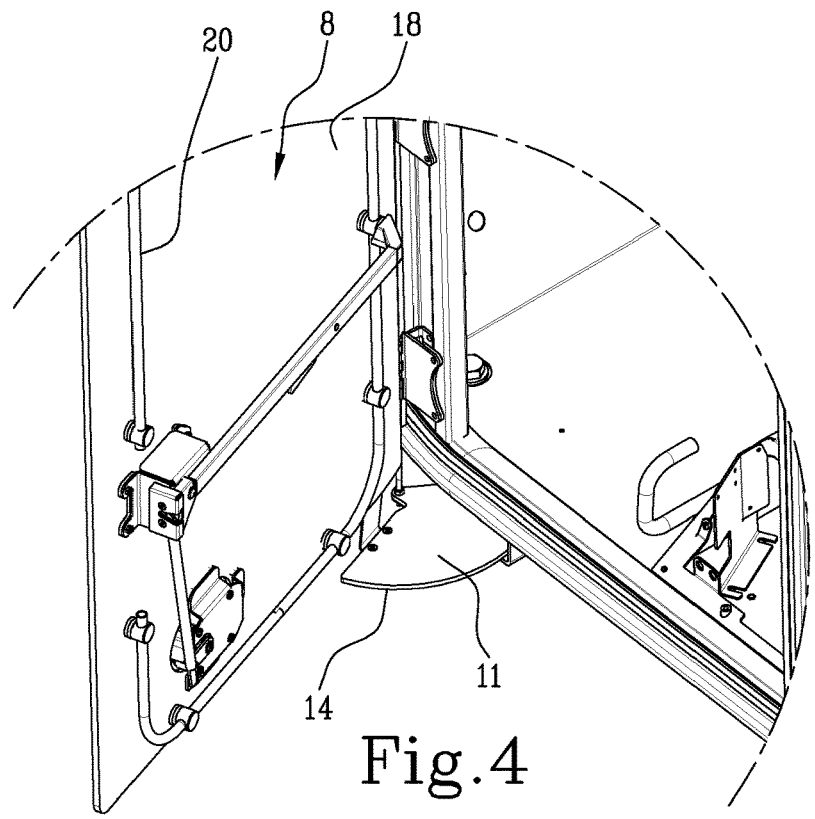
FIGS. 4 and 5 illustrate a perspective view of a detail in larger scale of FIG. 2 or 3 in two different operating conditions.
Figure 5:
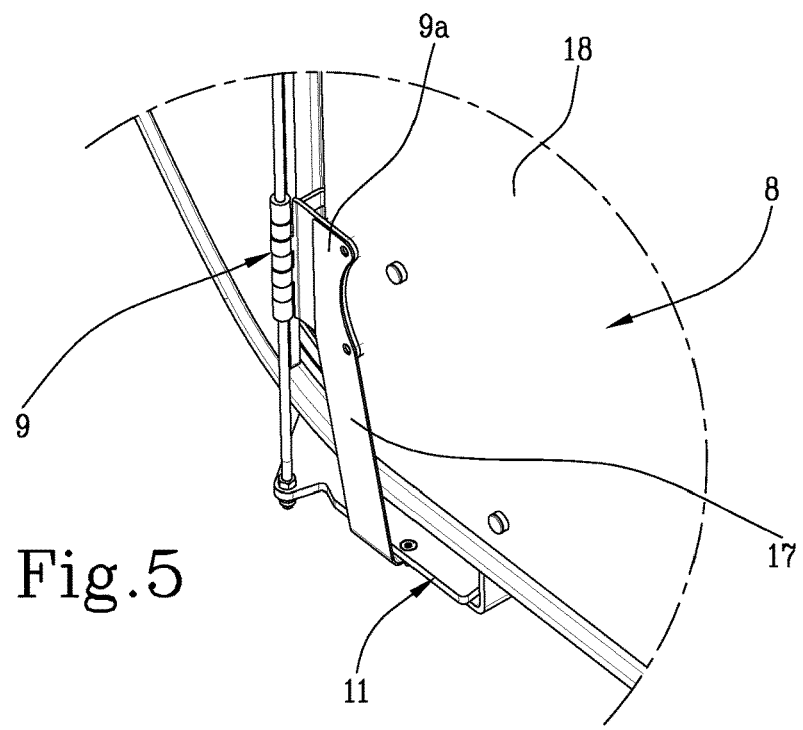

Reference numeral 6 denotes an operating member. The relative actuating means are not visible in the appended figures. The operating member and the actuating means are supported directly or indirectly by the frame 5. For example a rotating turret might be provided, interposed between the frame 5 and the operating member 6. In the case of the appended figures the operating member is constituted by a telescopic arm pivoted in a rear or lateral zone of the frame. As illustrated in FIG. 1, the telescopic arm can assume a transport configuration in which it lies on the frame so that a free end of the telescopic arm is arranged in a frontal position. Alternatively the maneuvering member can comprise other types of lift or digger devices, gripping devices or the like.

The invention includes a maneuver cab 7 arranged directly or indirectly on the frame and comprising at least an access door 8. The access door 8 is hinged to a structure of the maneuver cab 7 by means of at least one hinge 9 comprising a rotation portion 9a secured to the access door 8 and mounted rotatably on a hinge pin 10 secured to the structure of the maneuver cab 7. The access door 8 is preferably hinged to a structure of the maneuver cab 7 by means of at least one hinge 9 arranged on a front side of the access door, to enable an opening of an "automobile" type.

A control panel, not illustrated, is included internally of the maneuver cab, configured for enabling control of the movement of the machine and the actuation of the operating member.

In the type of machine illustrated in the appended figures, the maneuver cab 7 is arranged laterally with respect to the maneuvering member.

In general, the maneuver cab 7 and the frame (5) define an encumbering volume of the machine 1.

Reference numeral 11 denotes a step board arranged at the access door 8 of the maneuver cab 7. Coupling means are also provided operatively associated to the maneuver cab 7 and/or to the frame 5 of the working machine for supporting said step board 11.

The coupling means are configured for allowing an actuation movement of said step board 11 between a retracted position in which the step board remains substantially inside the encumbering volume of the machine 1, and an extracted position in which it protrudes, thereby defining a supporting surface, walkable by the operator, able to facilitate entering the maneuver cab 7.

The coupling means are preferably configured for allowing a rotational actuation movement of the step board 11 about an axis of rotation 12, for example defined by a rotation pin 13 associated to the maneuver cab and/or to the frame of the working machine.

The rotation pin 13 preferably comprises an extension of the hinge pin 10. According to a possible embodiment, the step board 11 exhibits a planar configuration which, in the extracted position, defines a bearing plane that is walkable by the operator.

As shown in the illustrated example, the axis of rotation 12 is substantially perpendicular to the step board 11 which remains parallel to itself during the actuation movement.

The step board 11 is preferably lunette-shaped 25 or it has the form of a circular sector of a disk, comprising an arcuate profile 14 arranged in a radially outer position with respect to a central axis of the lunette or the angular sector.

In the example of the appended figures, the axis of rotation (12) is arranged in a radially inner portion of the step board.

The machine 1 can comprise a supporting element 15 associated to the frame 5 of the working machine and/or to the maneuver cab 7.

In this case, the step board 11 is arranged resting on the supporting element 15.

The supporting element 15 (and/or the step board 11) comprises at least one block 16 of a low friction coefficient material, for example Teflon®; in this case, the block 16 is interposed between the supporting element 15 and the step board 11.

Actuation means are preferably provided, operatively associated to the step board 11.

The actuation means are configured for imposing the actuation movement via which the step board is brought from the retracted position to the extracted position thereof in conjunction with the opening of the access door 8 of the maneuver cab 7 and from the extracted position to the retracted position in conjunction with the closing of the access door 8 of the maneuver cab 7.

The actuation means comprise for example at least one connection element operatively interposed between the step board 11 and the access door 8 so that the step board is solidly constrained to the access door, in such a way that the opening/closing of the access door generates the actuation movement of the step board.

An embodiment of the actuation means includes an arm 17 having a first portion 17a secured to the access door 8 or afforded in a single piece with the access door and a second portion 17b secured to the step board 11 or realised in a single piece with the step board.

The first portion and the second portion are preferably angled so that the step board 11 defines a supporting surface arranged below the access door 8 in a normal operation configuration of the working machine.

The first portion 17a of the arm 17 is preferably fixed to a rotation portion of a hinge of the access door 8.

According to a possible embodiment, the access door 8 comprises a panel 18 made of a transparent material, for example glass or a plastic material, having substantially the same dimensions as an access door 19 of the maneuver cab 7, at least a metal hinge 9 mounted on the panel 18 and a metal supporting ring 20 arranged on a side of the panel 18 suitable for being arranged towards the inside of the maneuver cab 7, when the access door is closed.

In FIG. 1, owing to the advanced position of the maneuver cab 7, the access door 8 is arranged directly above access steps 20, making it difficult for the operator to reach the maneuver cab and at the same time open the access door.

With the present invention, at the moment of opening the door 8 the step board 11 rotates about the axis of rotation 12 so as to reach the extracted position in which the operator has a further bearing plane to use.

The extraction or re-insertion of the step board 11 advantageously takes place at the same time as the opening/closing of the door 8 and is caused by the movement of the door 8.

In a possible alternative, the actuation means comprise at least a position detector of the access door 8 configured for detecting the opening/closing of the access door 8 and at least an actuator mounted on the maneuver cab and/or on the frame of the working machine and configured for imposing the actuation movement on the step board 11. The position detector is configured for enabling a command signal of a control switchboard of the working machine suitable for actuating the actuator.

In a possible alternative, the axis of rotation 12 of the step board 11 is substantially parallel to the same step board 11.

In a further embodiment the coupling means coincide with the actuation means, by including, for example in the case of the figures, only the arm 17 without the rotation pin 13.

The invention claimed is:
1. A self-propelled working machine (1) comprising:
   moving means (2) which allows movement of the machine on a bearing plane (3),
   propulsion means (4) operatively connected to the moving means and effective to cause and maintain the movement of the working machine on the bearing plane, a frame (5) supporting the moving means and the propulsion means, at least one operating member (6) and actuating means connected thereto, said operating member and said actuating means being supported by the frame (5), a maneuver cab (7) supported by the frame (5) and comprising at least an access door (8), and wherein said maneuver cab (7) and said frame (5) define an encumbering volume of the machine, wherein the machine (1) comprises a step board (11) arranged at the access door (8) of the maneuver cab (7) and coupling means (13, 17) operatively connected to the maneuver cab (7) or to the frame (5) of the working machine for supporting said step board (11), said coupling means allowing an actuation movement of said step board (11) between a retracted position in which said step board (11) remains substantially inside said encumbering volume, and an extracted position in which it protrudes, thereby defining a supporting surface, walkable by the operator, able to facilitate entering the cab (7);

wherein the machine (1) comprises actuation means (17) operatively connected to said step board (11) and suitable for imposing said actuation movement to the step board (11) via which said step board is brought from the retracted position to the extracted position thereof in conjunction with the opening of the maneuver cab's access door and from the extracted position to the retracted position thereof in conjunction with the closing of the maneuver cab's access door (8);

wherein the actuation means comprises at least one connection element operatively interposed between said step board (11) and said access door (8) so that the step board (11) is solidly constrained with the access door (8), in such a way that the opening/closing of the access door (8) generates the actuation movement of the step board (11);

wherein said connection element comprises an arm (17) having a first portion (17a) secured to the access door (8) or provided in a single piece with the access door (8) and a second portion (17b) secured to the step board (11) or provided in a single piece with the step board (11); and wherein said access door (8) is hinged to a structure of the maneuver cab by means of at least one hinge (9) and wherein said first portion (17a) of the arm (17) is fixed to a rotational portion (9a) of said at least one hinge arranged at the access door (8).

2. The self-propelled working machine according to claim 1, in which said coupling means are configured for allowing a rotational actuation movement of the step board (11) about an axis of rotation (12).

3. The self-propelled working machine according to claim 2, wherein said axis of rotation (12) is defined by a rotation pin (13) connected to the maneuver cab (7) or to the frame (5) of the working machine.

4. The self-propelled working machine according to claim 2, wherein said step board (11) exhibits a planar configuration which, in the extracted position, defines a supporting surface that is walkable by the operator and wherein said axis of rotation (12) is substantially perpendicular to said step board (11).

5. The self-propelled working machine according to claim 4, wherein said axis of rotation (12) is defined by a rotation pin (13) connected to the maneuver cab (7) or to the frame (5) of the working machine, wherein said access door (8) is hinged to a structure of the maneuver cab by means of at least one hinge (9) comprising a rotation portion (9a) secured to the access door (8) and rotatingly mounted on a hinge pin (10), which hinge pin (10) is secured to the maneuver cab structure, and wherein said rotation pin (13) comprises an extension of said hinge pin (10).

6. The self-propelled working machine according to claim 1, wherein said step board (11) is lunette-shaped or has the form of a circular sector of a disk, comprising an arcuate profile (14) arranged in a radially outer position with respect to a central axis of the lunette or the circular sector.

7. The self-propelled working machine according to claim 4, wherein said step board (11) is lunette-shaped or has the form of a circular sector of a disk, comprising an arcuate profile (14) arranged in a radially outer position with respect to a central axis of the lunette or the circular sector, wherein said axis of rotation (12) is arranged in a radially inner portion of the step board (11).

8. The self-propelled working machine according to claim 1, comprising a supporting element (15) connected to the frame of the working machine or to the maneuver cab and wherein said step board (11) is arranged on said supporting element (15).

9. The self-propelled working machine according to claim 8, wherein said supporting element (15) or said step board (11) comprises at least one block (16) of a low friction coefficient material interposed between said supporting element (15) and said step board (11).

10. The self-propelled working machine according to claim 1, wherein said first portion (17a) and said second portion (17b) are angled so that said step board (11) defines a supporting surface arranged below the access door (8) in a normal operation configuration of the working machine.

11. The self-propelled working machine according to claim 1, wherein said step board (11) exhibits a planar structure which defines, in the extracted position, a supporting surface walkable by the operator and wherein said axis of rotation (12) is substantially perpendicular to said step board (11).

12. The self-propelled working machine according to claim 1, wherein said access door (8) is hinged to a structure of the maneuver cab by means of at least one hinge (9) disposed on a front side of the access door (8).

* * * * *